(12) United States Patent
Benson

(10) Patent No.: US 10,174,520 B1
(45) Date of Patent: Jan. 8, 2019

(54) HAND TOOL FOR UNLOCKING AND LOCKING AIRCRAFT PALLET LOCKING MECHANISMS

(71) Applicant: Steve Lawrence Benson, Culver City, CA (US)

(72) Inventor: Steve Lawrence Benson, Culver City, CA (US)

( * ) Notice: Subject to any disclaimer, the term of this patent is extended or adjusted under 35 U.S.C. 154(b) by 218 days.

(21) Appl. No.: 15/383,984

(22) Filed: Dec. 19, 2016

Related U.S. Application Data

(60) Provisional application No. 62/269,790, filed on Dec. 18, 2015.

(51) Int. Cl.
*E05B 19/20* (2006.01)
*E05B 35/00* (2006.01)

(52) U.S. Cl.
CPC ............ *E05B 19/20* (2013.01); *E05B 35/008* (2013.01)

(58) Field of Classification Search
CPC ........ E05B 19/20; E05B 35/008; B66F 15/00; B66F 19/00
USPC .................. 254/36; 294/24, 26, 19.1, 61, 51
See application file for complete search history.

(56) References Cited

U.S. PATENT DOCUMENTS

| | | | | |
|---|---|---|---|---|
| 1,199,454 A | * | 9/1916 | De Vries | B66F 15/00 254/131 |
| 3,837,622 A | * | 9/1974 | Gale | B25B 9/00 254/131 |
| 5,137,314 A | * | 8/1992 | Gunter | B66F 15/00 254/131 |
| D475,258 S | | 6/2003 | Wilson | |
| 7,040,203 B1 | * | 5/2006 | Chistiano | B25B 33/00 81/3.55 |
| 7,354,084 B2 | * | 4/2008 | Freiling | B01D 53/9431 294/15 |
| 2005/0172415 A1 | | 8/2005 | Beek | |
| 2006/0028807 A1 | * | 2/2006 | Vigil | E05B 19/20 362/120 |
| 2015/0275549 A1 | | 10/2015 | Lin | |

* cited by examiner

*Primary Examiner* — David B Thomas
(74) *Attorney, Agent, or Firm* — Plager Schack LLP; Mark H. Plager; Eric Liou

(57) ABSTRACT

A hand tool for use by a user to lock and unlock a locking mechanism to secure a pallet to an aircraft is provided. The locking mechanism is coupled to a floor of the aircraft and includes a release trigger operably connected to a clamp that is designed to engage with a flange of the pallet. The hand tool includes an elongated rod having a top portion, an intermediate portion and a bottom portion, the bottom portion having a hook member with a curved hook portion continuously connected to an end hook portion, the end hook portion having a top slanted surface oriented approximately 5 degrees relative to a first horizontal plane. The elongated rod is designed to maneuver to permit the hook member to communicate with the release trigger of the locking mechanism, thereby unlocking or locking the locking mechanism.

6 Claims, 5 Drawing Sheets

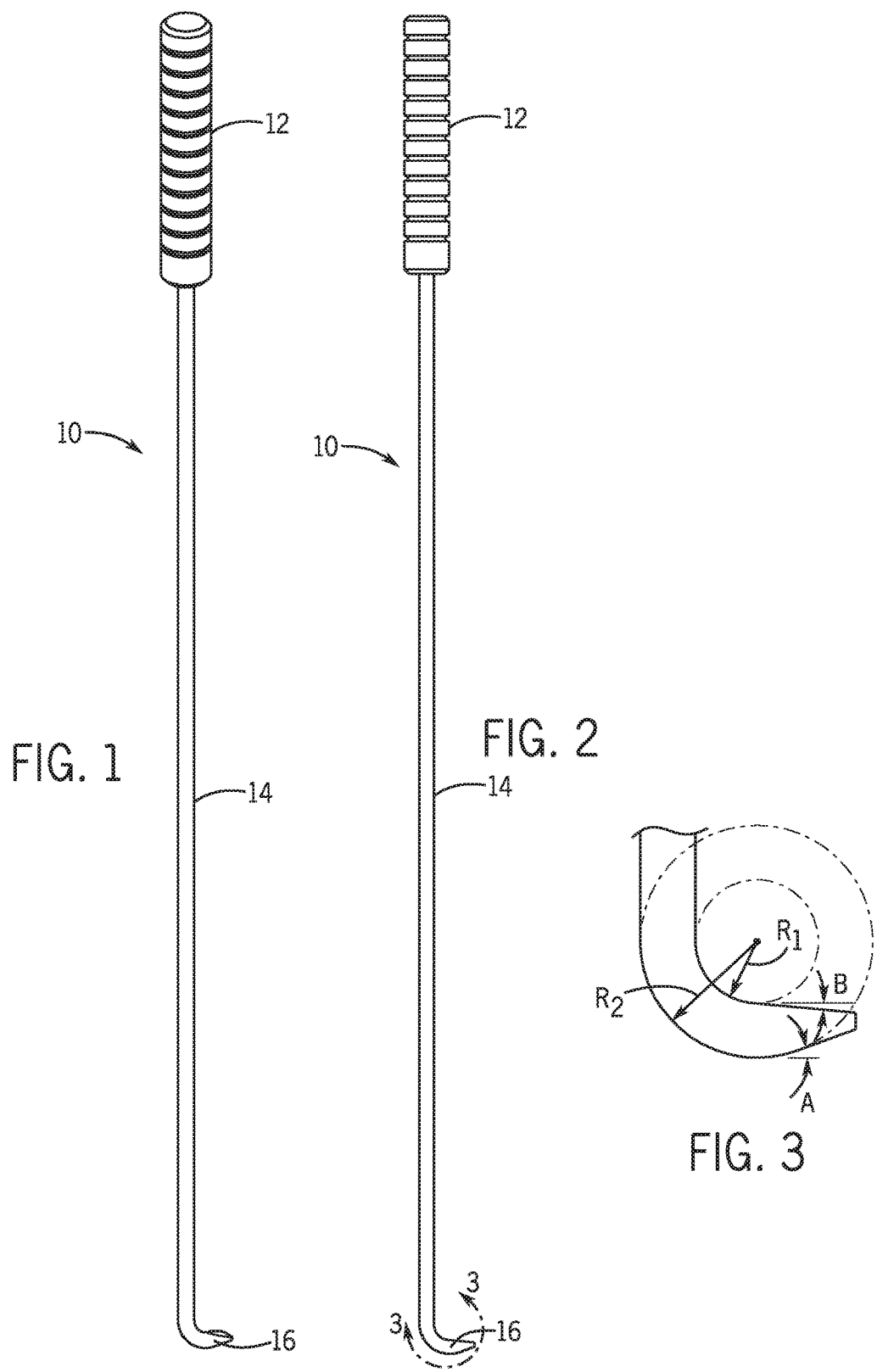

HAND TOOL FOR UNLOCKING AND LOCKING AIRCRAFT PALLET LOCKING MECHANISMS

RELATED APPLICATION

The application claims priority to provisional patent application U.S. Ser. No. 62/269,790 filed on Dec. 18, 2015, the entire contents of which is herein incorporated by reference.

BACKGROUND

The embodiments herein relate generally to pallets used to carry cargo on vehicles such as aircraft, shipping vessels or other cargo holds.

Pallets and containers are often used to carry cargo on different vehicles. On cargo aircraft, each pallet is secured to the interior floor of the aircraft by a plurality of locking mechanisms. One type of locking mechanism commonly used to secure the pallet to the aircraft floor comprises a release trigger and clamp that engages with a flange of the pallet. The manual locking and unlocking of the locking mechanism requires individuals to bend down and use their hands and fingers to maneuver the release trigger. This procedure places the user in an awkward bent over position, which increases the chance the user suffers an injury to the back, hand, fingers, or other areas of the body. Cargo aircraft may contain hundreds of locking mechanisms. This significantly increases loading and unloading times of the aircraft pallets if the locking mechanisms are manually locked and unlocked.

A variety of hand tools designed for use in different applications exist as disclosed in U.S. D475258, U.S. Patent Application Publications 2015/0275549 and 2005/0172415, which generally disclose elongated rod members. However, these hand tools do not comprise rod members with the optimal curvature and shape to effectively communicate with the locking mechanisms that secure pallets to aircraft.

As such, there is a need in the industry for a hand tool that addresses the limitations of the prior art, which effectively permits a user to use the hand tool to efficiently lock and unlock pallet locking mechanisms to vehicles such as aircraft, shipping vessels or other cargo holds. There is a further need for the hand tool to reduce injuries and user effort when used with the pallet locking mechanisms.

SUMMARY

A hand tool for use by a user to lock and unlock a locking mechanism configured to secure a pallet to an aircraft is provided. The locking mechanism is coupled to a floor of the aircraft and comprises a release trigger operably connected to a clamp that is configured to engage with a flange of the pallet. The hand tool comprises an elongated rod comprising a top portion, an intermediate portion and a bottom portion, the bottom portion comprising a hook member continuously connected to the intermediate portion of the rod and comprising a curved hook portion continuously connected to an end hook portion, the end hook portion of the hook member comprising a top slanted surface and a bottom slanted surface, the top slanted surface being oriented approximately 5 degrees relative to a first horizontal plane, wherein the elongated rod is configured to maneuver to permit the hook member of the elongated rod to communicate with the release trigger of the locking mechanism, thereby unlocking or locking the locking mechanism. In certain embodiments, a handle is coupled to the top portion of the elongated rod.

BRIEF DESCRIPTION OF THE FIGURES

The detailed description of some embodiments of the invention will be made below with reference to the accompanying figures, wherein the figures disclose one or more embodiments of the present invention.

FIG. 1 depicts a perspective view of certain embodiments of the hand tool;

FIG. 2 depicts a side elevation view of certain embodiments of the hand tool;

FIG. 3 depicts a section view of certain embodiments of the hand tool taken along line 3-3 in FIG. 2;

DETAILED DESCRIPTION OF CERTAIN EMBODIMENTS

Figure 4:
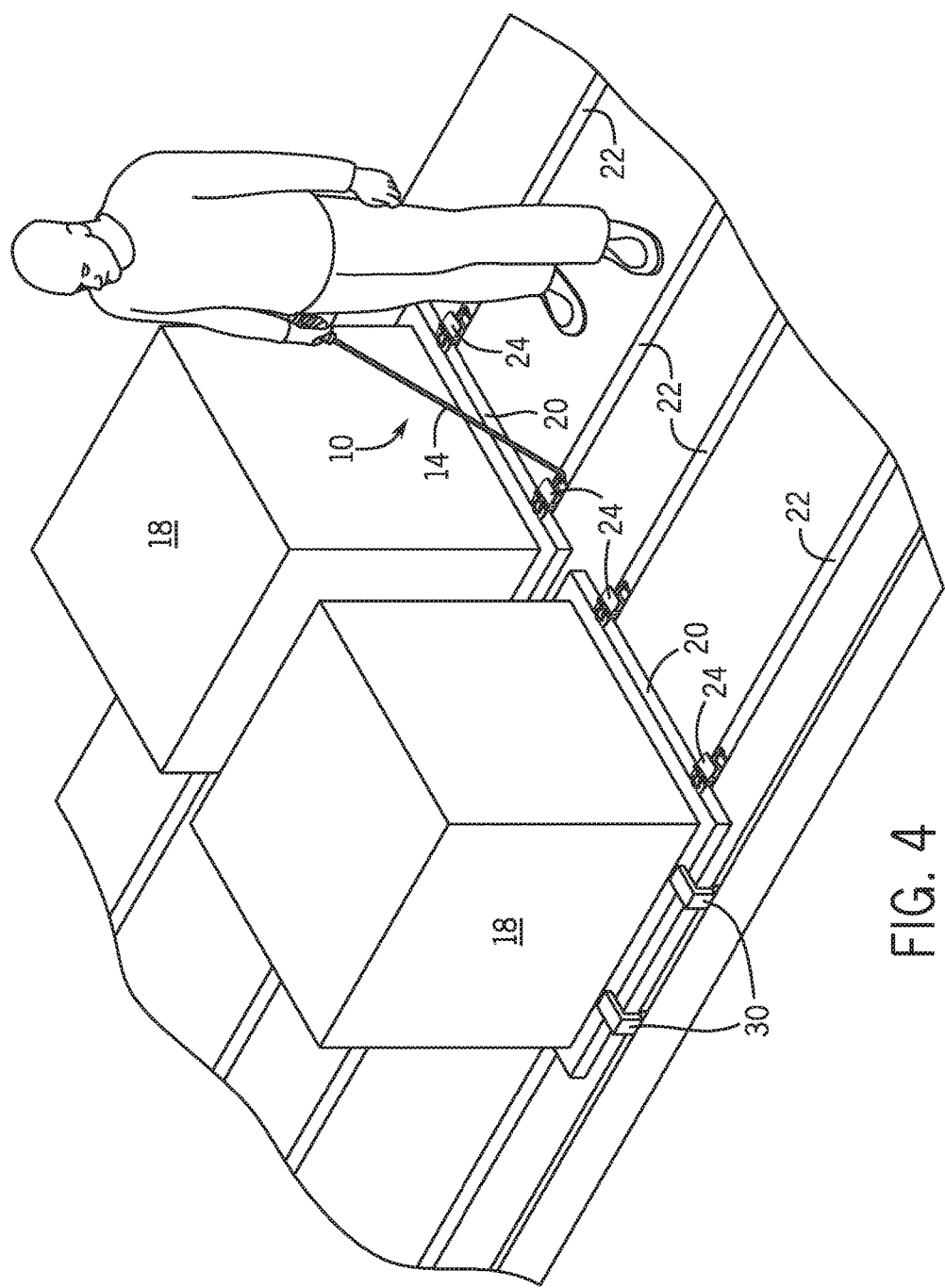
FIG. 4 depicts a perspective view of certain embodiments of the hand tool shown in use.

As depicted in FIGS. 1-2 and 4, hand tool 10 is configured for use in locking and unlocking locking mechanisms 24 and side locks 30 on an aircraft (not shown). As depicted in FIG. 4, locking mechanisms 24 and side locks 30 are configured to engage with flanges 20 of pallets 18 to secure the pallets to the aircraft floor. Locking mechanisms 24 are secured to channels 22 in the floor of the aircraft. Side locks 30 are coupled to the aircraft floor by a rail member. It shall be appreciated that any number of locking mechanisms 24 and/or side locks 30 may be used to accommodate the particular type of pallet or aircraft used.

As depicted in FIGS. 1-2, hand tool 10 comprises an elongated rod 14 comprising a top portion, an intermediate portion and a bottom portion. Handle 12 is coupled to the top portion of elongated rod 14. The bottom portion of elongated rod 14 comprises hook 16. In certain embodiments, elongated rod 14 is preferably a ⅜" diameter cold-rolled steel rod with a height of approximately 31" from the bottom of hook 16 to the start of handle 12. Handle 12 is preferably a wood, plastic or alternative material known in the field. In one embodiment, handle 12 comprises an approximate diameter of 1¼" and length of 7". Handle 12 comprises an opening (not shown) configured to receive a top portion of elongated rod 10. Handle 12 may be secured to elongated rod 10 by an adhesive and/or mechanical fasteners.

Hook 16 is continuously connected to the intermediate portion of elongated rod 14. As depicted in FIG. 3, hook 16 comprises a curved hook portion continuously connected to an end hook portion. The curved hook portion and end hook portion are shaped to enhance the effectiveness of hand tool 10 when in use with locking mechanism 24 and side locks 30. More specifically, the end hook portion of hook 16 comprises a slanted top surface oriented an angle B relative to a first horizontal plane and a slanted bottom surface oriented an angle A relative to a second horizontal plane. In a preferred embodiment, angle B is approximately 5 degrees and angle A is approximately 16 degrees. In one embodiment, the end hook portion of the hook member comprises a blunt end. The curved hook portion of hook 16 comprises a top surface with a radius of curvature of $R_1$ and a bottom surface with a radius of curvature of $R_2$. In a preferred embodiment, $R_1$ is approximately 0.3438 inches and $R_2$ is approximately 0.7031 inches.

Figure 5:
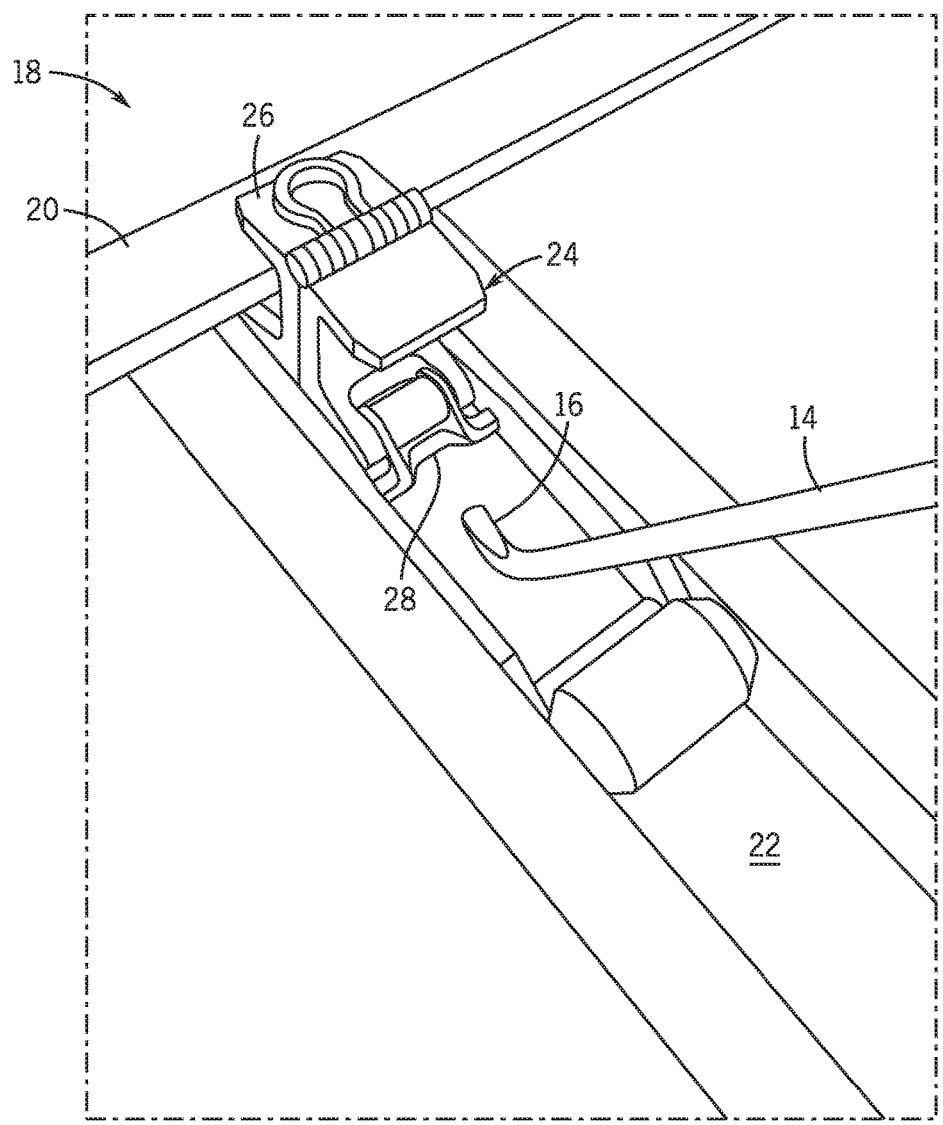
FIG. 5 depicts a perspective view of certain embodiments of the hand tool illustrating locking mechanism 24 in the locked position.
Figure 6:
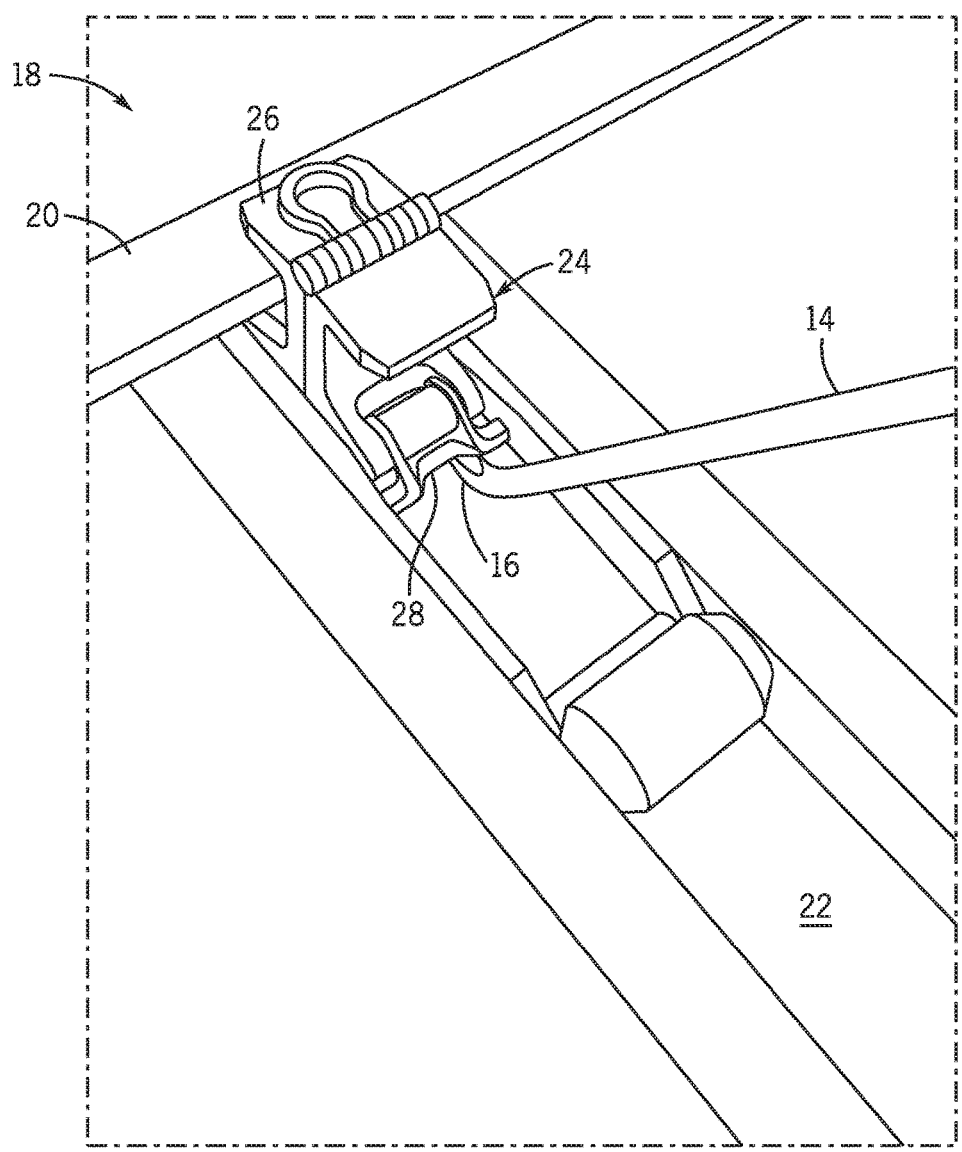
FIG. 6 depicts a perspective view of certain embodiments of the hand tool illustrating the unlocking of locking mechanism 24.
Figure 7:
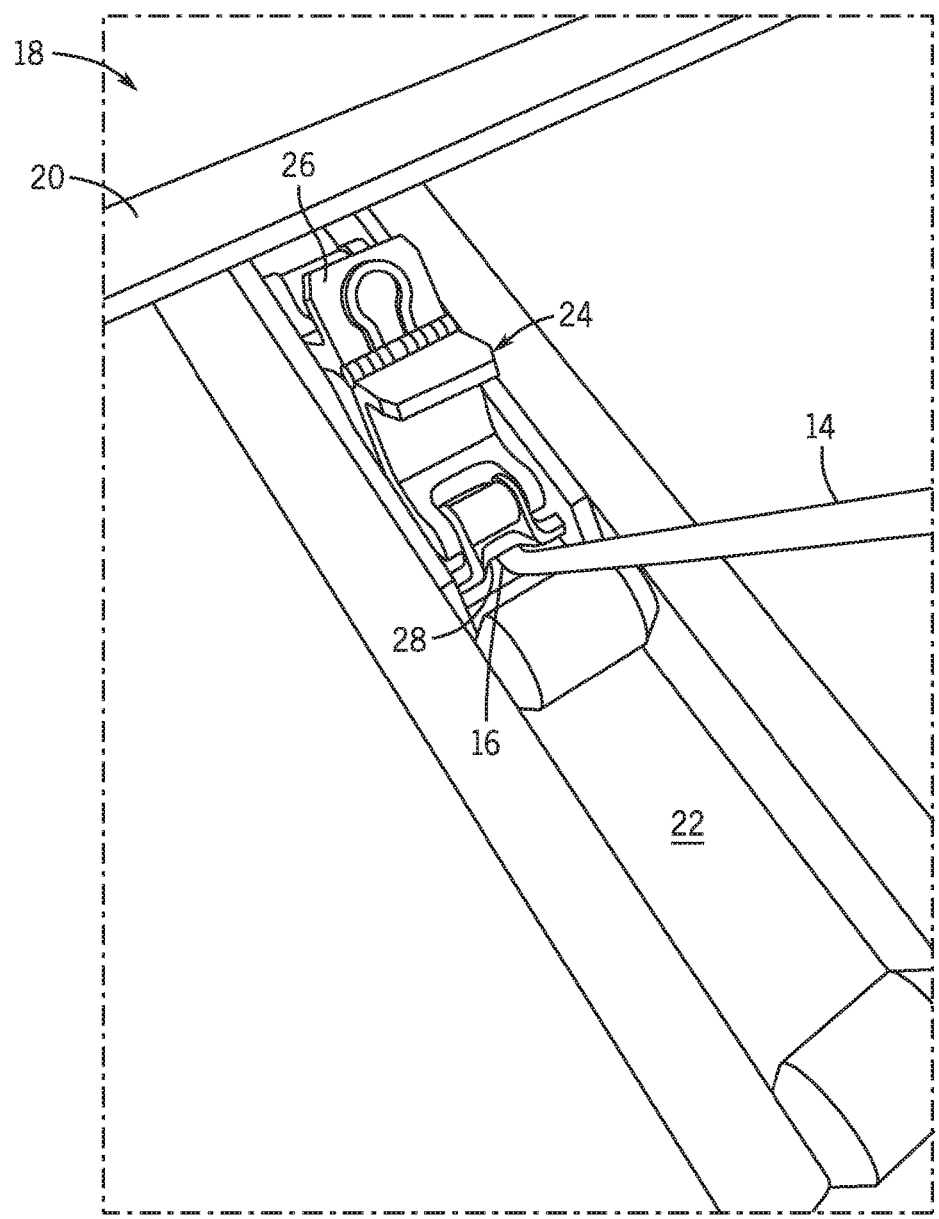
FIG. 7 depicts a perspective view of certain embodiments of the hand tool illustrating locking mechanism 24 in the unlocked position.

FIGS. 5-7 depict the use of hand tool 10 to unlock locking mechanism 24, which comprises clamp 26 and release trigger 28. FIG. 5 depicts locking mechanism 24 in the locked position. In this position, clamp 26 is engaged with flange 20 of pallet 18. To unlock locking mechanism 24, the user grabs handle 12 and maneuvers elongated rod 14 such that hook 16 is positioned beneath release trigger 28 as shown in FIG. 6. The user pulls up on handle 12 and twists the handle either to the left or right. This disengages clamp 26 of locking mechanism 24 from flange 20 of pallet 18 as shown in FIG. 7. To lock locking mechanism 24, the user maneuvers elongated rod 14 such that hook 16 is beneath release trigger 28. The user pulls up on handle 12 and pushes the handle forward and away from the user. This permits clamp 26 of locking mechanism 24 to engage with flange 20 of pallet 18.

It shall be appreciated that hand tool 10 may also be used to disengage each side lock 30 from flange 20 of pallet 18. In one embodiment, side lock 30 is a spring-loaded flip-type lock. Hand tool 10 can be maneuvered to permit hook 16 to communicate with side lock 30 to disengage side lock 30 from flange 20.

It shall be appreciated that the components of hand tool 10 described in several embodiments herein may comprise any alternative known materials in the field and be of any color, size and/or dimensions. It shall be appreciated that the components of hand tool 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A hand tool for use by a user to lock and unlock a locking mechanism configured to secure a pallet to an aircraft, the locking mechanism coupled to a floor of the aircraft and comprising a release trigger operably connected to a clamp configured to engage with a flange of the pallet, the hand tool comprising:
    an elongated rod comprising a top portion, an intermediate portion and a bottom portion, the bottom portion comprising a hook member continuously connected to the intermediate portion of the rod and comprising a curved hook portion continuously connected to an end hook portion, the end hook portion of the hook member comprising a top slanted surface and a bottom slanted surface, the top slanted surface being oriented approximately 5 degrees relative to a first horizontal plane;
    wherein the elongated rod is configured to maneuver to permit the hook member of the elongated rod to communicate with the release trigger of the locking mechanism, thereby unlocking or locking the locking mechanism.

2. The hand tool of claim 1, wherein the bottom slanted surface of the end hook portion of the hook member is oriented approximately 16 degrees relative to a second horizontal plane.

3. The hand tool of claim 2, wherein the curved hook portion of the hook member comprises a top surface and a bottom surface, wherein the top surface of the curved hook portion comprises a radius of curvature of approximately 0.3438 inches.

4. The hand tool of claim 3, wherein the bottom surface of the curved hook portion comprises a radius of curvature of approximately 0.7031 inches.

5. The hand tool of claim 4, further comprising a handle coupled to the top portion of the elongated rod.

6. The hand tool of claim 5, wherein the end hook portion of the hook member comprises a blunt end.

* * * * *